United States Patent Office 3,799,926
Patented Mar. 26, 1974

3,799,926
CERTAIN s-TRIAZOLO[1,5-a]PYRIMIDINE COMPOUNDS AND THEIR PREPARATION
George Frank Duffin, Romford, and James Hogg, Harlow, England, assignors to Minnesota Mining and Manufacturing Company, St. Paul, Minn.
No Drawing. Continuation of abandoned application Ser. No. 816,433, Jan. 16, 1969, which is a division of application Ser. No. 425,941, Jan. 15, 1965, now Patent No. 3,462,272. This application Dec. 16, 1971, Ser. No. 208,899
Int. Cl. C07d 57/18
U.S. Cl. 260—256.5 R      15 Claims

ABSTRACT OF THE DISCLOSURE

Novel heterocyclic compounds of the formula

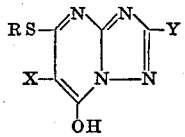

wherein R is alkyl, X is hydrogen, cyano, —CONR$^2$R$^3$ in which R$^2$ and R$^3$ are hydrogen or alkyl, COOR$^4$ wherein R$^4$ is alkyl, and COR$^5$ wherein R$^5$ is alkyl or aryl, and Y is hydrogen, alkyl, alkylthio, aryl and amino; and a process for its preparation which comprises reacting a 3-amino-1,2,4-triazole with a β,β-dialkylthioacrylic ester.

---

This application is a continuation of U.S. application Ser. No. 816,433, filed Jan. 16, 1969 now abandoned, which is a division of U.S. application Ser. No. 425,941, filed Jan. 15, 1965, now U.S. Pat. No. 3,462,272.

This invention relates to novel organic heterocyclic compounds, their use in photosensitive constructions and processes for their preparation.

It is well known that light sensitive silver halide emulsions tend to yield, upon development, a deposit of silver in those areas which have not been exposed to light. This deposit, which is commonly termed "chemical fog," impairs the quality of the image and in certain cases may obliterate the image. The tendency of this fog to form is more pronounced when the emulsion is of the highly sensitive type and also when the emulsions are stored under adverse conditions, e.g. high temperatures and high humidity. In order to counteract the tendency of silver halide emulsions to form this fog it is common practice to incorporate various stabilizers into the emulsion. Most of these stabilizers are successful to a high degree in preventing fog formation, but many of them suffer from the disadvantage of reducing the sensitivity of the emulsion and the rate of image development.

It is an object of this invention to provide a new class of heterocyclic chemical compounds suitable for use as stabilizers for silver halide emulsions.

Another object of this invention is to provide stabilized light sensitive emulsions.

A further object of this invention is to provide stabilized silver halide emulsions in which the sensitivity is not significantly reduced by the presence of the stabilizer.

Yet another object of this invention is to provide a method for producing compounds suitable for use as photographic sensitizers.

Other objects and advantages will become apparent from the following description of the invention.

The heterocyclic compounds in accordance with the invention may be prepared by reacting a 3-amino-1,2,4-triazole of the general formula:

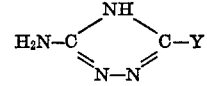

in which Y represents a hydrogen atom, or an alkyl, alkylthio, aryl or amino group, and a beta,beta-dialkylthioacrylic ester of the general formula:

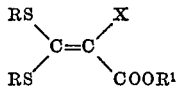

in which R and R$^1$ each independently represents an alkyl group, and X represents a hydrogen atom, or a CN group, a CONR$^2$R$^3$ group where R$^2$ and R$^3$ each independently represents a hydrogen atom or an alkyl group, a COOR$^4$ group where R$^4$ represents an alkyl group, or a COR$^5$ group where R$^5$ represents an alkyl or an aryl group.

The reaction is effected by heating a mixture of the two reactants, usually at a temperature from 60° C. to 180° C., preferably from 90° C. to 110° C. Also an organic acid catalyst may be included in the reaction mixture and then the reaction will normally be effected at a temperature below the boiling point of this acid catalyst. Particular reactants will determine the choice of reaction conditions. Thus, with some reactants a higher temperature or a catalyst will be needed in order to speed up the reaction or obtain a worthwhile yield, whereas with other reactants a useful yield is obtained by warming to a lower temperature a mixture of the reactants.

Examples of organic acid catalysts which may be used are aliphatic acids, for example, acetic acid and pivalic acid and phenols, for example, phenol, cresol, xylenol and their halogenated derivatives. A phenol is, however, preferred to an aliphatic acid since, when using an aliphatic acid, the product of the reaction is contaminated by the acyl derivative of whatever 3-aminotriazole is used and this acyl derivative is difficult to separate.

The organic heterocyclic compounds in accordance with the invention are tetraazaindenes having the general formula:

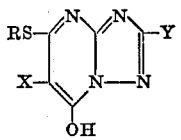

in which R, X and Y are as defined above.

Preferred heterocyclic compounds are those in which R is as defined above and X represents a hydrogen atom or a CN group, and Y represents a hydrogen atom, or an alkyl or alkylthio group.

The preparation of a number of organic heterocyclic compounds in accordance with the invention will now be described by way of example.

EXAMPLE 1

2,6-dimethylthio-4-hydroxy-1,3,3a,7-tetraazaindene

3 - amino - 5 - methylthio - 1,2,4 - triazole (3.25 g.), ethyl-beta,beta-dimethylthioacrylate (4.8 g.) (Thuillier and Vialle, Bull. Soc. Chim. France, 1962, 2182: C.A. 59 2786 [1961]) and phenol (32 g.) were heated overnight on a steam bath. The resulting solid was washed well with ether to remove excess phenol and unreacted ester. It was then recrystallized from a large volume of glacial acetic acid to give the desired heterocyclic product (2.8 g., 49%). M.P. 264 to 265° C.

I.R. peaks (cm.$^{-1}$): 3040, 1680, 1610, 1535.
U.V. peaks (m.), in 0.1 N NaOH: 243 (strong), 283 (medium).
Analysis: S; found (monohydrate): 26.0;

$C_7H_8N_4S_2O \cdot H_2O$ requires: 26.0.

EXAMPLE 2

2-methyl-4-hydroxy-6-methylthio-1,3,3a,7-tetraazaindene 3-amino-5-methyl-1,2,4-triazole (2.5 g.), ethyl-beta,beta-dimethylthioacrylate (4.8 g.) and acetic acid (28 ml.) were heated overnight on a steam bath. The product was dissolved in a 2 N sodium carbonate solution and precipitated by the addition of a 2 N hydrochloric acid solution to give the desired heterocyclic compound (3.8 g., 71%). M.P.>320° C.

I.R. peaks (cm.$^{-1}$): 3130, 1670, 1610, 1540.
U.V. peaks (m.), in 0.1 N NaOH: 242 (strong), 268 (medium), 281 (medium).
Analysis: Found: C, 42.9; H, 4.5; N, 28.6; S, 15.7; $C_7H_8N_4SO$ requires: C, 42.8; H, 4.1; N, 28.6; S, 16.3.

EXAMPLE 3

2-Isopropylthio-4-hydroxy-6-methylthio-1,3,3a,7-tetraazaindene 3-amino-5-isopropylthio-1,2,4-triazole (3.9 g.), ethyl-beta,beta-dimethylthioacrylate (4.8 g.) and pivalic acid (32 g.) were heated on a steam bath overnight. The resulting solid was washed with ether and the ethanol soluble fraction was extracted. This fraction was then recrystallized from ethanol to give the desired heterocyclic product (2.1 g., 32%). M.P. 201 to 202° C.

I.R. peaks (cm.$^{-1}$): 3060, 1700, 1630, 1550.
U.V. peaks (m.), in 0.1 N NaOH: 244 (strong), 283 (medium).
Analysis: S; found: 25.0; $C_{10}H_{18}N_4S_2O$ requires: 25.2.

EXAMPLE 4

2,6-dimethylthio-4-hydroxy-5-cyano-1,3,3a,7-tetraazaindene 3-amino-5-methylthio-1,2,4-triazole (13.0 g., 0.1 M) and ethyl - alpha - cyano - beta,beta-dimethylthioacrylate (10.85 g., 0.05 M), prepared by the method shown in United Kinkdom patent specification No. 597,446, were heated together overnight on a steam bath. A crude product (19.0 g.) was obtained. This product was recrystallized from aqueous ethanol to give a material, M.P. 252 to 254° C. This material was boiled with a 2 N solution of hydrochloric acid (150 ml.) for 40 minutes, the mixture was filtered, and the product was recrystallized from aqueous ethanol to give fine white needle-shaped crystals. M.P. 287° C.

I.R. peaks (cm.$^{-1}$): 2220, 1640, 1610, 1570.
U.V. peaks (m.): 252 (strong), 300 (shoulder).
Analysis: found: C, 38.2; H, 3.0; N, 28.0; S, 25.3;

$C_8H_7N_5S_2O$ requires: C, 37.9; H, 2.8; N, 27.7; S, 25.3.

EXAMPLE 5

4-hydroxy-5-cyano-6-isopropylthio-1,3,3a,7-tetraazaindene 3-amino-1,2,4-triazole (8.4 g., 0.1 M) and ethyl-alpha-cyano-beta,beta-diisopropylthioacrylate (13.7 g., 0.05 M) were heated together on a steam bath for 129 hours. A solid yellow product (5.2 g.) was recrystallized from aqueous ethanol, M.P. 216 to 219° C. This product was boiled with a 2 N hydrochloric acid solution (150 ml.) for 40 minutes, the mixture was filtered and the product was then recrystallized from aqueous ethanol to give fine white needle-shaped crystals. M.P. 297 to 300° C.

I.R. peaks (cm.$^{-1}$): 2210, 1680, 1600.
U.V. peaks (mµ): 253 (strong), 296 (medium).
Analysis: found: C, 46.5; H, 4.2; N, 30.5; S, 13.3;

$C_9H_9N_5SO$ requires: C, 46.0; H, 3.8; N, 29.8; S, 13.6.

EXAMPLE 6

2-methyl-4-hydroxy-5-cyano-6-methylthio-1,3,3a,7-tetraazaindene 3-amino-5-methyl-1,2,4-triazole (9.8 g., 0.1 M) and ethyl - alpha-cyano-beta,beta-dimethylthioacrylate (10.85 g., 0.05 M) were heated together on a steam bath for 96 hours. A pale yellow solid was recrystallized from aqueous ethanol. M.P. 290 to 293° C. This solid was boiled with 2 N hydrochloric acid solution (150 ml.) for one hour, the mixture was filtered, and the desired product was recrystallized from aqueous ethanol to give fine white crystals. M.P. 323 to 326° C.

I.R. peaks (cm.$^{-1}$): 2220, 1670, 1600.
U.V. peaks (mµ): 250 (strong), 297 (medium).
Analysis: found: C, 43.5; H, 3.3; N, 31.6; S, 14.8;

$C_8H_7N_5SO$ requires: C, 43.4; H, 3.2; N, 31.7; S, 14.5.

The following table, Table 1, sets out the results of the preparation of further organic heterocyclic compounds in accordance with the invention. These compounds were prepared by methods similar to those given above in Examples 1 to 6. All the compounds were recrystallized from boiling aqueous ethanol or a boiling acetic acid and water mixture. The reactants mentioned in the table were as follows:

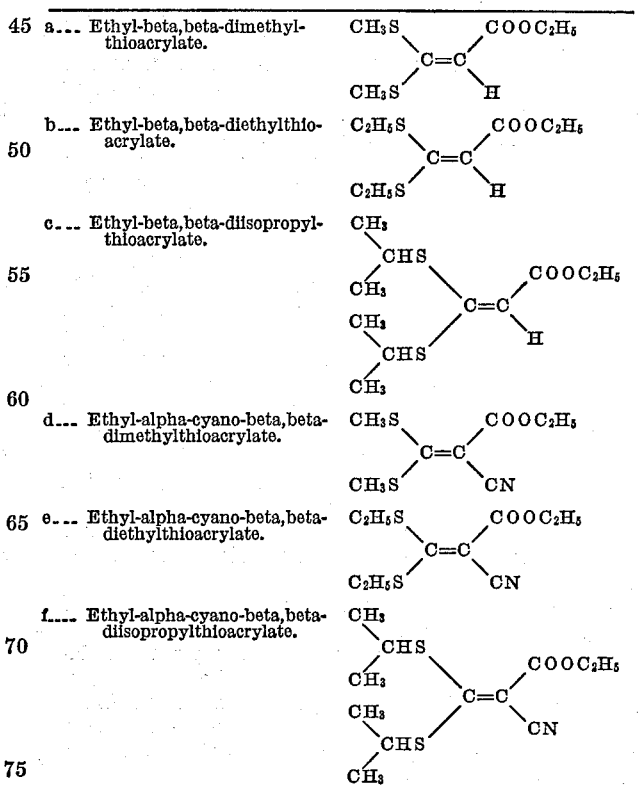

TABLE—Continued g — 3-amino-1,2,4-triazole 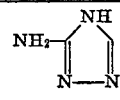

h — 3-amino-5-methylthio-1,2,4-triazole. 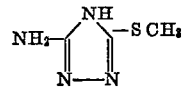

i — 3-amino-5-ethylthio-1,2,4-triazole. 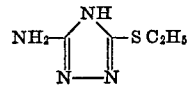

j — 3-amino-5-isopropylthio-1,2,4-triazole. 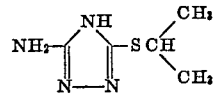

k — 3-amino-5-methyl-1,2,4-triazole. 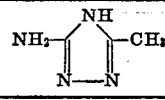

The compound prepared had the following general formula:

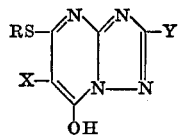

in which R, X and Y are given in the table.

TABLE 1

| Ex. | Reactants Ester | Reactants Triazole | Product −R | Product −Y | Product −X | Reaction Time (hours) | Reaction Temp. (°C.) | Catalyst | Found C | Found H | Found N | Found S | Required C | Required H | Required N | Required S | M.P. (°C.) uncorrected |
|---|---|---|---|---|---|---|---|---|---|---|---|---|---|---|---|---|---|
| 7 | a | g | −CH₃ | −H | −H | 16 | 120 | Phenol | 39.7 | 3.8 | 30.1 | 17.6 | 39.6 | 3.3 | 30.8 | 17.6 | 292−4 |
| 8 | b | g | −C₂H₅ | −H | −H | 74 | 100 | do | 43.0 | 4.2 | 28.5 | 15.8 | 42.8 | 4.1 | 28.6 | 16.3 | 274−6 |
| 9 | a | k | −CH₃ | −CH₃ | −H | 10 | 130 |  | 42.9 | 4.5 | 28.6 | 15.7 | 42.8 | 4.1 | 28.6 | 16.3 | 315−7 |
| 10 | b | k | −C₂H₅ | −CH₃ | −H | 64 | 100 | Phenol | 45.7 | 5.0 | 26.7 | 15.3 | 45.7 | 4.8 | 26.7 | 15.2 | 280 |
| 11 | c | k | −CH(CH₃)₂ | −CH₃ | −H | 10 | 130 |  | 47.9 | 5.3 | 23.5 | 12.9 | 48.2 | 5.3 | 25.0 | 14.3 | 270−2 |
| 12 | a | h | −CH₃ | −SCH₃ | −H | 64 | 100 | Monohydrate |  |  | 26.0 |  |  |  | 26.0 |  | 260−2 |
| 13 | b | h | −C₂H₅ | −SCH₃ | −H | 16 | 100 | Phenol | 40.2 | 4.2 | 23.3 | 26.4 | 39.7 | 4.1 | 23.2 | 26.4 | 230 |
| 14 | c | h | −CH(CH₃)₂ | −SCH₃ | −H | 16 | 100 | do | 42.1 | 4.9 | 22.1 | 25.6 | 42.2 | 4.7 | 21.9 | 25.0 | 205−6 |
| 15 | a | i | −CH₃ | −SC₂H₅ | −H | 16 | 100 |  | 39.7 | 4.2 | 22.7 | 26.2 | 39.7 | 4.1 | 23.2 | 26.5 | 200−2 |
| 16 | b | i | −C₂H₅ | −SC₂H₅ | −H | 16 | 100 | Phenol | 41.9 | 4.7 | 22.2 | 24.3 | 42.4 | 4.3 | 22.0 | 25.0 | 230 |
| 17 | c | i | −CH(CH₃)₂ | −SC₂H₅ | −H | 8 | 100 | do | 44.6 | 5.2 | 20.7 |  | 44.5 | 5.2 | 20.7 |  | 190−2 |
| 18 | a | j | −CH₃ | −SCH(CH₃)₂ | −H | 16 | 100 | Phenyl acetic acid. |  |  | 25.0 |  |  |  | 25.2 |  | 200−1 |
| 19 | b | j | −C₂H₅ | −SCH(CH₃)₂ | −H | 16 | 100 | Chlorophenol. | 44.5 | 5.2 | 20.8 |  | 44.5 | 5.2 | 20.7 |  | 201−4 |
| 20 | c | j | −CH(CH₃)₂ | −SCH(CH₃)₂ | −H | 12 | 140 | Phenol | 46.9 | 5.7 | 19.6 | 21.6 | 46.5 | 5.6 | 19.8 | 22.5 | 175−8 |
| 21 | d | g | −CH₃ | −H | −CN | 16 | 100 | do | 40.5 | 2.6 | 33.5 | 15.3 | 40.5 | 2.4 | 33.8 | 15.5 | 285 |
| 22 | e | g | −C₂H₅ | −H | −CN | 74 | 100 |  |  |  |  |  |  |  |  |  | 309−12 |
| 23 | e | k | −C₂H₅ | −CH₃ | −CN | 72 | 100 |  | 46.4 | 4.4 | 30.3 | 13.6 | 46.0 | 3.8 | 29.8 | 13.6 | 294−6 |
| 24 | f | k | −CH(CH₃)₂ | −CH₃ | −CN | 72 | 100 |  | 47.9 | 4. | 28.1 | 12.8 | 48.2 | 4.4 | 28.1 | 12.8 | 255 |
| 25 | e | k | −C₂H₅ | −SCH₃ | −CN | 16 | 100 |  | 40.8 | 3.6 | 26.1 | 24.0 | 40.8 | 3.4 | 26.1 | 23.9 | 262−3 |
| 26 | f | h | −CH(CH₃)₂ | −SCH₃ | −CN | 30 | 140 | Phenol | 43.0 | 3.9 | 25.3 | 23.0 | 42.7 | 3.9 | 24.9 | 22.9 | 259−62 |
| 27 | d | i | −CH₃ | −SC₂H₅ | −CH | 16 | 100 |  | 39.3 | 3.8 | 27.2 | 23.6 | 40.8 | 3.4 | 26.1 | 23.9 | 275−7 |
| 28 | e | i | −C₂H₅ | −SC₂H₅ | −CH | 74 | 100 |  | 42.7 | 3.9 | 25.0 | 22.8 | 42.7 | 3.9 | 24.9 | 22.8 | 310−2 |
| 29 | f | i | −CH(CH₃)₂ | −SC₂H₅ | −CN | 100 | 100 | Phenol | 44.2 | 4.4 | 24.5 | 20.1 | 44.7 | 4.4 | 23.7 | 21.7 | 218−20 |

TABLE 1—Continued

| | Reactants | | Product | | | Reaction | | | Analysis | | | | | | | | M.P. (° C.) uncorrected |
|---|---|---|---|---|---|---|---|---|---|---|---|---|---|---|---|---|---|
| | | Tria- | | | | Time | Temp. | | Found | | | | Required | | | | |
| Ex. | Ester | zole | —R | —Y | —X | (hours) | (° C.) | Catalyst | C | H | N | S | C | H | N | S | |
| 30 | d | j | —CH₃ | —SCH(CH₃)/CH₃ | —CN | 27 | 100 | | 42.9 | 3.9 | 24.9 | 23.1 | 42.7 | 3.9 | 24.9 | 22.8 | 244–5 |
| 31 | e | j | —C₂H₅ | —SCH(CH₃)/CH₃ | —CN | 12 | 100 | | 44.6 | 4.8 | 23.8 | | 44.5 | 4.4 | 23.9 | 21.7 | 225–6 |
| 32 | f | j | —CH(CH₃)/CH₃ | —SCH(CH₃)/CH₃ | —CN | 100 | 100 | Phenol | 46.9 | 5.1 | 22.8 | 19.6 | 46.6 | 4.9 | 22.7 | 20.7 | 212–4 |

The heterocyclics of the invention although effective in preventing the formation of fog, do not cause significant decrease in the sensitivity of the emulsions, and indeed, in some cases they may even increase the sensitivity. It is found that particularly good results are obtained when the substituents R, X and Y in the formulae of the reactants given above each contain not more than 4 carbon atoms.

Best results have been obtained with emulsions containing from 5 mg. to 2.0 g. per gram mole of silver present in the emulsion. The stabilizing compounds will normally be added at the completion of chemical ripening or digestion of the emulsion, although it may sometimes be possible for the addition to take place at an earlier stage in the preparation of the emulsion. At whatever stage is chosen the solids may be introduced by themselves or as solutions in inert solvents such as water or ethanol.

The compounds need not necessarily be directly added to the silver halide emulsions in order to give protection to the emulsions against the formation of fog. The compounds have been found effectively to stabilize a layer of silver halide emulsion if that layer is in contact with a layer containing one of the heterocyclic compounds so that at some time during the manufacture of the photographic film the stabilizer can diffuse into the adjacent emulsion layer. This method of effecting stabilization may be particularly advantageous for photographic films, such as color films, which contain a number of layers of silver halide emulsion.

The following examples illustrate the stabilizing effect of the heterocyclic compounds in accordance with the invention on silver halide photographic emulsions.

EXAMPLE 33

To a silver chlorobromide photographic emulsion which had been ripened to about 0.2 micron average grain diameter, washed and digested in the presence of sodium thiosulphate until it reached its maximum speed was added 0.385 millimole of the compound obtained in Example 1 per mole of silver present in the emulsion. The resulting admixture was coated onto a film base and dried.

One sample (sample A) of the coated film was kept for seven days under normal conditions of temperature and humidity whilst a further sample (sample B) was left for the same period in an incubator at a temperature of 125° F. and a relative humidity of 65% (i.e. under accelerating aging conditions which approximate to a comparatively long shelf-life under normal conditions and a somewhat shorter shelf-life under tropical conditions). The film was subsequently exposed to light and developed in a standard metol hydroquinone borax developer. The fog which had formed was then measured in each case by determining the density, and also the relative film speeds were measured.

For comparison purposes a photographic film base was coated with an identically prepared emulsion but containing no stabilizing compound. Two samples (samples A′ and B′) of this coated film were subjected to identical conditions of temperature and humidity, and exposed and developed in an identical manner, as the samples A and B, respectively, and the fog formed and their relative speeds were determined.

The results obtained from these experiments are tabulated below in Table 2.

TABLE 2

| Test | Sample | | | |
|---|---|---|---|---|
| | A | A′ | B | B′ |
| Fog | 0.10 | 0.14 | 0.29 | 1.83 |
| Relative log speed | 2.39 | 2.15 | 2.56 | (¹) |

¹ Too fogged to measure.

From these values it will be observed that the unstabilized emulsion subjected to a period of high temperature and humidity conditions (sample B′) was so fogged that its speed could not be measured. The emulsion sample B (i.e. containing the compound of Example 1) on the other hand had increased fog, but this increase was very much smaller than for sample B′ and was in no way detrimental to the commercial use of the film.

It will also be observed that the speeds of the samples containing the stabilizer (samples A and B) were somewhat greater than the speed of the unstabilized sample A′.

EXAMPLE 34

The experiments described in Example 33 were repeated with a photographic film base coated with an emulsion prepared in the same manner as described in Example 33 but containing as the stabilizing compound 0.385 millimole of the compound obtained as described in Example 2 per mole of silver in the emulsion.

The results obtained from the experiments are tabulated below in Table 3. For ease of comparison the results obtained with the unstabilized emulsion coating are repeated in the table.

TABLE 3

| Test | Sample | | | |
|---|---|---|---|---|
| | A | A′ | B | B′ |
| Fog | 0.11 | 0.14 | 0.36 | 1.83 |
| Relative log speed | 2.36 | 2.15 | 2.50 | (¹) |

¹ Too fogged to measure.

EXAMPLE 35

The experiments described in Example 33 were repeated with a photographic film base coated with an emulsion prepared in the same manner as described in Example 33 but containing as the stabilizing compound 0.385 millimole of the compound obtained as described in Example 3 per mole of silver in the emulsion. After exposure to light, the two samples A and B respectively were developed in an infectious hydroquinone low-sulphite developer, instead of the standard MQ borax developer, but otherwise the procedure was exactly the same as that set forth in Example 33.

The results obtained from the experiments are tabulated below in Table 4, together with the results obtained with unstabilized emulsion coatings (samples A' and B', respectively) on which the identical experiments had been carried out.

TABLE 4

| Test | Sample | | | |
|---|---|---|---|---|
| | A | A' | B | B' |
| Fog | 0.05 | 0.05 | 0.08 | 1.96 |
| Relative log speed | 1.98 | 1.90 | 2.02 | (¹) |

¹ Too fogged to measure.

It will be observed that the results obtained in Examples 34 and 35 correspond to those obtained in Example 33 and confirm the effectiveness of the heterocyclic compounds of the invention in stabilizing photographic silver halide emulsons.

The following tables, Tables 5 and 6, show the results of tests to illustrate the stabilizing effect of the compounds of the invention on light sensitive silver chlorobromide emulsions. These tests were effected in the manner illustrated above in Examples 33 to 35. The heterocyclic compound used as a standard was 4-hydroxy-6-methyl-1,3,3a,7-tetraazaindene.

TABLE 5

| Ex. | Example No. of stabilizing compound used | Quantity of compound used (millimole/mole of silver) | Non-incubated film | | Incubated film | |
|---|---|---|---|---|---|---|
| | | | Speed | Fog | Speed | Fog |
| | None | None | 2.40 | 0.16 | 2.17 | D$_{max}$ |
| 36 | Standard 7 | 0.5 | | 0.14 | | 0.38 |
| | | 1.25 | | 0.16 | | 0.29 |
| 37 | 8 | 0.5 | 2.40 | 0.12 | 2.36 | 0.26 |
| | | 1.25 | 2.34 | 0.10 | 2.43 | 0.17 |
| 38 | 10 | 0.5 | 2.42 | 0.17 | 2.58 | 0.24 |
| | | 1.25 | 2.49 | 0.11 | 2.63 | 0.22 |
| 39 | 13 | 0.5 | 2.31 | 0.08 | 2.38 | 0.16 |
| | | 1.25 | 2.39 | 0.10 | 2.44 | 0.14 |
| 40 | 14 | 0.5 | 2.33 | 0.08 | 2.34 | 0.20 |
| | | 1.25 | 2.35 | 0.06 | 2.34 | 0.13 |
| 41 | 16 | 0.5 | 2.35 | 0.11 | 2.33 | 0.25 |
| | | 1.25 | 2.42 | 0.19 | 2.37 | 0.30 |
| 42 | 17 | 0.5 | 2.54 | 0.10 | 2.33 | 0.12 |
| | | 1.25 | 2.49 | 0.09 | 2.32 | 0.13 |
| 43 | 19 | 0.5 | 2.49 | 0.15 | 2.56 | 0.36 |
| | | 1.25 | 2.35 | 0.08 | 2.50 | 0.16 |
| 44 | 20 | 0.5 | 2.45 | 0.10 | 2.31 | 0.12 |
| | | 1.25 | 2.42 | 0.09 | 2.27 | 0.11 |

TABLE 6

| Ex. | Example No. of stabilizing compound used | Quantity of compound used (millimole/mole of silver) | Non-incubated film | | Incubated film | |
|---|---|---|---|---|---|---|
| | | | Speed | Fog | Speed | Fog |
| | None | None | 2.40 | 0.14 | | D$_{max}$ |
| 45 | Standard 7 | 0.5 | | 0.14 | | 0.38 |
| | | 1.25 | | 0.12 | | 0.24 |
| 46 | 21 | 0.5 | 2.40 | 0.15 | 2.33 | 0.28 |
| | | 1.25 | 2.40 | 0.14 | 2.33 | 0.24 |
| 47 | 22 | 0.5 | 2.42 | 0.16 | 2.40 | 0.35 |
| | | 1.25 | 2.36 | 0.14 | 2.36 | 0.28 |
| 48 | 5 | 0.5 | 2.40 | 0.14 | 2.35 | 0.34 |
| | | 1.25 | 2.42 | 0.14 | 2.41 | 0.27 |
| 49 | 6 | 0.5 | 2.40 | 0.16 | 2.41 | 0.25 |
| | | 1.25 | 2.45 | 0.16 | 2.44 | 0.25 |
| 50 | 23 | 0.5 | 2.40 | 0.10 | 2.25 | 0.30 |
| | | 1.25 | 2.43 | 0.09 | 2.25 | 0.30 |
| 51 | 24 | 0.5 | 2.38 | 0.11 | 2.26 | 0.34 |
| | | 1.25 | 2.39 | 0.15 | 2.28 | 0.37 |
| 52 | 4 | 0.5 | 2.35 | 0.12 | 2.35 | 0.24 |
| | | 1.25 | 2.47 | 0.15 | 2.42 | 0.24 |
| 53 | 25 | 0.5 | 2.50 | 0.09 | 2.30 | 0.10 |
| | | 1.25 | 2.56 | 0.10 | 2.35 | 0.14 |

TABLE 6—Continued

| Ex. | Example No. of stabilizing compound used | Quantity of compound used (millimole/mole of silver) | Non-incubated film | | Incubated film | |
|---|---|---|---|---|---|---|
| | | | Speed | Fog | Speed | Fog |
| 54 | 26 | 0.5 | 2.30 | 0.06 | 2.07 | 0.18 |
| | | 1.25 | 2.57 | 0.08 | 2.10 | 0.12 |
| 55 | 27 | 0.5 | 2.48 | 0.15 | 2.35 | 0.34 |
| | | 1.25 | 2.40 | 0.18 | 2.38 | 0.36 |
| 56 | 28 | 0.5 | 2.41 | 0.16 | 2.36 | 0.27 |
| | | 1.25 | 2.42 | 0.20 | 2.40 | 0.35 |
| 57 | 29 | 0.5 | 2.41 | 0.09 | 2.24 | 0.20 |
| | | 1.25 | 2.47 | 0.09 | 2.29 | 0.26 |
| 58 | 30 | 0.5 | 2.40 | 0.15 | 2.32 | 0.28 |
| | | 1.25 | 2.40 | 0.17 | 2.32 | 0.30 |
| 59 | 31 | 0.5 | 2.40 | 0.16 | 2.35 | 0.30 |
| | | 1.25 | 2.40 | 0.16 | 2.32 | 0.28 |
| 60 | 32 | 0.5 | 2.41 | 0.13 | 2.36 | 0.30 |
| | | 1.25 | 2.48 | 0.12 | 2.33 | 0.30 |

It will be seen from Tables 5 and 6 that the high standard of stabilization achieved by the heterocyclic compounds in Examples 33 and 35 is maintained by other compounds.

EXAMPLE 61

A silver iodobromide emulsion containing about 1.8 molar percent of silver iodide was digested in the presence of sodium thiosulphate and sodium aurichloride until maximum speed was obtained. The emulsion was divided into two parts, to one of which no addition was made, whilst to the other was added 0.50 millimole of the compound obtained in Example 15 per mole of silver present in the emulsion. After the addition of coating aids, the emulsions were coated onto film bases and dried.

Samples of both coatings were then subjected to temperature and humidity treatments as described in Example 33, and were subsequently exposed to light and developed in a standard metol hydroquinone developer. Fog and speed measurements of the processed films were then made. The results from these experiments were shown below in Table 7.

TABLE 7

| Test | Sample | | | |
|---|---|---|---|---|
| | A | A' | B | B' |
| Fog | 0.08 | 0.18 | 0.05 | 0.62 |
| Relative log speed | 4.25 | 4.28 | 4.02 | 3.86 |

It will be observed that, after incubation, the emulsion containing the compound of Example 15 had very low fog and had lost considerably less speed than had the untreated emulsion, whose incubation fog level was intolerably high.

The embodiments of the invention in which an exclusive property or privilege is claimed are defined as follows:

1. A heterocyclic compound of the formula

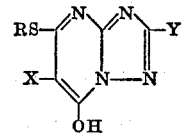

wherein R is alkyl; X is hydrogen or cyano, and Y is hydrogen, alkyl or alkylthio, R and Y each containing not more than 4 carbon atoms.

2. 2,6-dimethylthio-4-hydroxy-1,3,3a,7-tetraazaindene.

3. 2,6-dimethylthio - 4 - hydroxy - 5 - cyano-1,3,3a,7-tetraazaindene.

4. 4-hydroxy-6-ethylthio-1,3,3a,7-tetraazaindene.

5. 2-methyl - 4 - hydroxy-6-ethylthio-1,3,3a,7-tetraazaindene.

6. 2-methylthio - 4 - hydroxy-6-ethylthio-1,3,3a,7-tetraazaindene.

7. 2-isopropylthio - 4 - hydroxy - 6 - ethylthio-1,3,3a,7-tetraazaindene.

8. 2-methylthio - 4 - hydroxy-5-cyano-6-ethylthio-1,3,3a,7-tetraazaindene.

9. 2-methylthio-4-hydroxy-5-cyano-6-isopropylthio-1,3,3a,7-tetraazaindene.

10. A process for the preparation of a tetraazaindene heterocyclic compound which comprises reacting at a temperature of from 60° C. to 180° C. a 3-amino-1,2,4-triazole of the formula

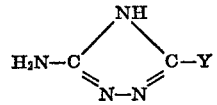

in which Y is selected from the group consisting of hydrogen, alkyl, alkylthio, and amino and a beta,beta-dialkylthioacrylic ester of the formula

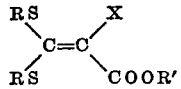

in which R and R' are alkyl, and X is selected from the group consisting of hydrogen, CN, CONR²R³ in which R² and R³ are members of the group consisting of hydrogen, and alkyl, COOR⁴ in which R⁴ is alkyl, and COR⁵ in which R⁵ is an alkyl, R, X, and Y each containing not more than 4 carbon atoms.

11. The process of claim 4 in which said elevated temperature is from 90° C. to 110° C.

12. The process of claim 10 in which the reaction is effected in the presence of an organic acid which is an aliphatic acid or a phenol as catalyst.

13. The process of claim 10 in which X is a member of the group consisting of hydrogen and CN, and Y is a member of the group consisting of hydrogen, alkyl and alkylthio.

14. A process for the preparation of a tetraazaindene heterocyclic compound which comprises reacting, at a temperature from 60° C. to 180° C., a 3-amino-1,2,4-triazole of the formula

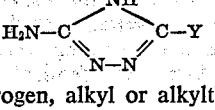

wherein Y is hydrogen, alkyl or alkylthio, and a β,β-dialkylthioacrylic ester of the formula

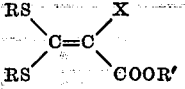

wherein R and R' are alkyl and wherein X is hydrogen or CN, R, X and Y each containing not more than 4 carbon atoms.

15. The process of claim 14 wherein said reaction is effected in the presence of an organic acid catalyst which is an aliphatic acid or a phenol and at a temperature below the boiling point of said catalyst.

References Cited
UNITED STATES PATENTS
2,566,659   9/1951   Fry _____ 95—7

RICHARD J. GALLAGHER, Primary Examiner

U.S. Cl. X.R.
260—308 R, 465.4

UNITED STATES PATENT OFFICE
CERTIFICATE OF CORRECTION

PATENT NO. : 3,799,926
DATED : March 26, 1974
INVENTOR(S) : George F. Duffin and James W. Hogg It is certified that error appears in the above-identified patent and that said Letters Patent are hereby corrected as shown below:

Col. 6, #24 under H, "4" should be --4.3--.

Col. 11, line 26, "The process of claim 4 in which" should be --The process of claim 10 in which--.

Signed and Sealed this eighteenth Day of November 1975

[SEAL]

Attest:

RUTH C. MASON
Attesting Officer

C. MARSHALL DANN
Commissioner of Patents and Trademarks